United States Patent Office 3,551,300
Patented Dec. 29, 1970

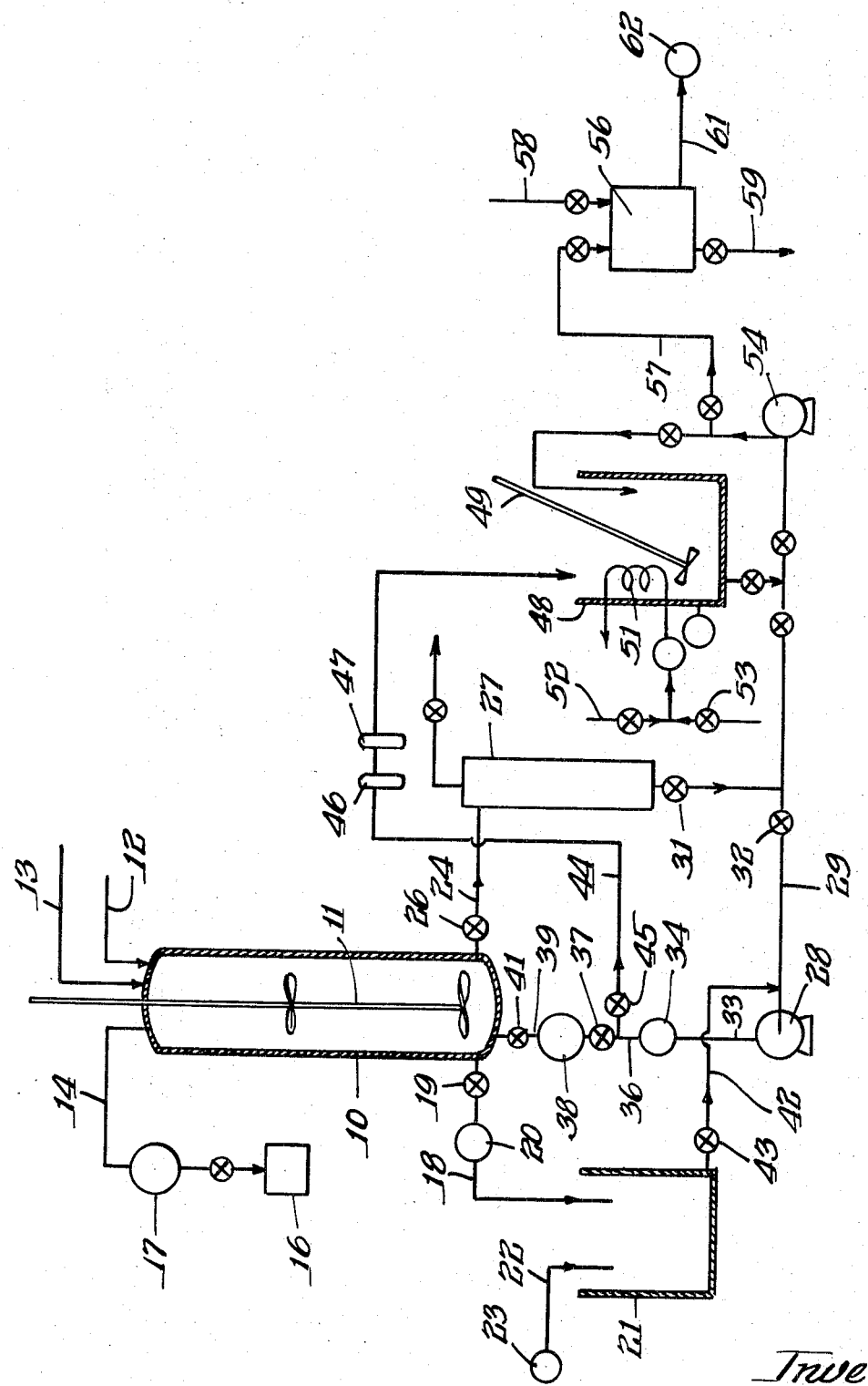

3,551,300
BY-WATER DISSOLUTION, STEAM DISTILLATION, ACTIVATED CARBON AND CATION EXCHANGE TREATMENT AND CRYSTALLIZATION
Kermit D. Longley, Park Forest, Ill., assignor to Witco Chemical Corporation, New York, N.Y., a corporation of Delaware
Filed Dec. 13, 1968, Ser. No. 783,565
Int. Cl. B01d 3/38; C07c 55/14
U.S. Cl. 203—31      4 Claims

ABSTRACT OF THE DISCLOSURE

Process of purifying crude adipic acid obtained by the air oxidation of mixtures of cyclohexanone and cyclohexanol comprising forming a strong to concentrated aqueous solution of the crude adipic acid and to which solution there is preferably added a small percentage of a strong, volatile oxidizing agent such as nitric acid and/or hydrogen peroxide, steam distilling said solution, contacting the steam distilled solution with activated carbon, then contacting the resulting activated carbon treated solution with a cation exchange resin, and then crystallizing adipic acid from the solution.

---

This invention relates to a novel process for purifying crude adipic acid obtained by the molecular oxygen oxidation of a mixture containing cyclohexanone and cyclohexanol in the presence of an acetic acid solvent.

The production of adipic acid by a two stage oxidation procedure starting with cyclohexane has long been known. In the first stage of such procedure, cyclohexane, in the liquid phase in a first oxidation zone, is oxidized by molecular oxygen, conventionally air, with or without a catalyst, to produce a mixture containing cyclohexanone and cyclohexanol together with other oxygenated products and unreacted cyclohexane. The unreacted cyclohexane is removed by distillation and recycled to the first oxidation zone. The remaining mixture, which contains the cyclohexanone, cyclohexonol and other oxygenated products, the cyclohexanone commonly being present in amounts greater than that of the cyclohexanol, is then oxidized in the liquid phase, at a temperature of about 70–100° C., in a second oxidation zone, in an acetic acid solvent in the presence of a catalyst system, which latter commonly includes a manganese salt such as manganese acetate which is soluble in the acetic acid. The oxidizing agent used in the second stage of the two stage process may be nitric acid or equivalent oxidizing agents such as nitric oxides or molecular oxygen such as air. Such procedures are disclosed, for instance, in U.S. Pats. Nos. 2,223,494; 2,439,513; 2,557,281; and 3,234,271; and in Petroleum Processing, May 1956, pp. 74–79.

The type of oxidizing agent used in the second stage of the process influences the nature of the impurities which are found in the reaction mixtures and which it is necessary to remove in order to obtain adipic acid in the required state of purity to enable it to be useful particularly in the production of nylon 6,6, or desirably for various other known uses of adipic acid such as plasticizers, foods and polyurethanes. Where nitric acid is used as the oxidizing agent in the second stage of the process, the organic and inorganic impurities present in the reaction product and which, unless removed, would contaminate the adipic acid are different from those which result from the use of molecular oxygen as the oxidizing agent in the second stage of the process.

Where nitric acid is the oxidant in the second stage of the aforementioned process, it has heretofore been known to effect purification of the crude initially crystallized adipic acid by separating the mother liquor (which contains large proportions of nitric acid) from the adipic acid crystals and subjecting said mother liquor to distillation until the volatiles therein have been reduced to about 30%, the overhead being recycled to the reaction stage. Then the residual mother liquor is diluted with water to reduce the concentration of nitric acid, the diluted mother liquor is cooled and adipic acid is crystallized therefrom. Other known procedures involve simply air-stripping the reaction mixture from the nitric acid oxidation step, steam distilling to remove overhead such impurities as valeric and butyric acids, concentrating the aqueous reaction liquor, cooling the same and crystallizing the adipic acid therefrom. Such procedures, and others, which are disclosed in such U.S. Pats. as Nos. 2,703,331; 2,776,990 and 2,804,475, are not applicable to the production of highly purified adipic acid from reaction mixtures in which molecular oxygen is used as the oxidizing agent in both the first and second oxidation stages of converting cyclohexane to adipic acid.

Where adipic acid has been proposed to be produced by a two stage oxidation procedure using molecular oxygen as the oxidizing agent in both stages and wherein acetic acid is used as the solvent in the second stage, it is known to effect recovery and purification of the adipic acid by concurrently cooling and concentrating the reaction mixture and then separating out the resulting allegedly substantially pure adipic acid, as is more particularly described in British Pat. No. 939,798. It has also heretofore been proposed, in such two stage molecular oxygen processes, to recover the adipic acid from the reaction mixture by a series of steps which include first crystallizing out adipic acid, for instance, in a vacuum growth crystallizer, centrifuging to recover the adipic acid crystals, treating the mother liquor with sulfuric acid, hydrolyzing at elevated temperatures, then distilling under reduced pressure to remove a substantial part of the acetic acid, chilling the bottoms to produce a second batch of adipic acid crystals, centrifuging to separate the adipic acid crystals, washing said crystals, dissolving the adipic acid crystals in water and recrystallizing to produce purer adipic acid, as is described at least in part in French Pat. No. 1,330,137.

Purification of crude or impure adipic acid has been proposed by procedures involving recrystallization from water, or from glacial acetic acid, or from other solvents. It has also heretofore been suggested to effect purification by dissolving crude adipic acid in water, adding a minor proportion of a cation exchange resin in the H-form, holding the mixture at about 70° C. for about one-half hour, removing the cation exchange resin by filtration, and then crystallizing the adipic acid from the resulting solution, as is more fully described in U.S.S.R. Pat. No. 157,976.

The present invention provides a novel process which is very effective for recovering exceptionally highly purified adipic acid obtained by the aforementioned two stage molecular oxygen oxidation of a mixture containing cyclohexanone and cyclohexanol in the presence of an acetic acid solvent. Crude adipic acid is first recovered from the reaction mixture by conventional procedures which include concentrating and then cooling said reaction mixture to crystallize out crude adipic acid therefrom, and also recovering crude adipic acid from the mother liquors therefrom.

The crude adipic acid, initially recovered from the reaction mixture, or recovered from the mother liquor, or mixtures of such so recovered crude adipic acid, is dissolved in water, particularly advantageously hot water, for instance, water at 90° C. to approximately boiling, to produce strong to concentrated solutions for example, containing about 30 to 50% of adipic acid by weight. It is preferred, then, to add a small amount of a volatile oxidizing agent, such as nitric acid and/or hydrogen peroxide, and, desirably, both nitric acid and hydrogen peroxide, for instance, in amounts up to about 0.5% and, better still, from about 0.1 to about 0.2%, by weight of said solution, to the solution and the latter is then steam distilled. The peroxide aids in producing an oxidized product and the nitric acid aids in effecting of hydrolysis of such esters as may be present. While the use of said oxidizing agents represents a desirable step in the overall process of the present invention, it is not essential to the broader aspects of the invention and it may be omitted.

The steam distilled solution is then contacted with an activated carbon, for instance, by passing said solution over or through a bed of activated carbon, and then said solution is contacted with a cation exchange resin, for instance, those marketed under the designations "Amberlite IR 20" (Rohm & Haas Company), and "Dowex 50 W" (The Dow Chemical Company), or other known cation exchange resins, by passing said solution over or through a bed of said resin. The solution is then separated from the cation exchange resin, and cooled to a temperature at which the adipic acid crystallizes out in an exceptionally purified form, for instance, a temperature of about 30 to 50° C. more or less. The process can be operated on either a batch or continuous basis.

While the order of the steps of treatment with the activated carbon and the cation exchange resin can be reversed, it is particularly advantageous that the activated carbon treatment step precede that of treatment with the cation exchange resin. The use of the combination of steps is critical to the process of the present invention.

In the accompanying drawing, a schematic arrangement is shown embodying a flow diagram for carrying out the process of the present invention. A steam distillation tank 10 is provided with an agitator or stirrer 11, and, at the top of said tank 10, an inlet pipe 12 for admitting hydrogen peroxide and an inlet pipe 13 for admitting nitric acid to said tank 10. Also connected to the top of said tank 10 is a pipe 14 which communicates with a condensate receiver 16 through a condenser 17. The lower end of the tank 10 leads through a pipe 18, having a valve 19 therein, and a heat exchanger 20, into an activated carbon or charcoal bed 21 for feeding hot water, or hot water containing small proportions of nitric acid and/or hydrogen peroxide, from the tank 10 to said bed 21. Crude adipic acid to be purified is fed to said bed 21 through a pipe or conduit 22 from a source 23. Also connected to the lower end of the tank 10 is a pipe 24, having a valve 26 therein, which leads to a cation exchange resin bed 27. A recycle pump 28 is connected to the bottom of the bed 27 through piping 29, having valves 31 and 32 therein. The outlet end of the pump 28 is connected through a pipe 33 to a heat exchanger 34 and thence through a pipe 36, having a valve 37 therein, to a heat exchanger 38 which, in turn, connects to the bottom of tank 10 through a pipe 39 having a valve 41 therein. It will, thus, be seen that the contents of tank 10 can be circulated through the cation exchange resin bed 27, through the heat exchanger 38 and back into tank 10. A pipe 42, having a valve 43 therein, connects from the bottom of the activated carbon or charcoal bed 21 to the inlet side of the pump 28.

Connected into the pipe 36 intermediate the heat exchanger 34 and the valve 37 is a pipe 44, having a valve 45 therein, which feeds into polishing filters 46 and 47 and thence into an adipic acid chrystallizer 48 having an agitator 49 therein, the temperature of the adipic acid solution to be crystallized in said crystallizer being controlled by means of an internal coil 51 connected to valved sources of supply 52 and 53 of cold water and hot water, respectively, which serve to provide cooling water at a temperature 30° to 40° F. lower than the solution temperature to prevent excessive crystal buildup on the cooling coil 51. A centrifuge pump 54 serves to pump the slurry, when cooled, for instance, to about room temperature, into a centrifuge 56, through valved pipe 57. Wash water is pumped into the centrifuge through valved pipe 58 to wash the crystals of adipic acid, the separated liquor and water washings being discharged through valved pipe 59 to the sewer, and the purified adipic acid being removed through line 61 to storage 62.

In the practice of the process of the present invention, shown batchwise in the above-described drawing, the solution tank 10 is filled with water which is then heated by recycle through the cation exchange resin bed 27, pump 28 and heat exchanger 38. The flow is then transferred to pass through the activated carbon or charcoal bed 21 and pump 28. The crude adipic acid is passed from source 23 through conduit 22 onto the top of the activated carbon or charcoal bed 21 where it dissolves in the hot water issuing through pipe 18. The resulting adipic acid solution is pumped into the cation exchange resin bed 27 and hydrogen peroxide and/or nitric acid is added to the solution tank 10. The adipic acid solution is then steam distilled to remove impurities, the heat required being supplied through extraneous means or through the use of a heat exchanger in the system. The flow of the adipic acid solution may, if desired, again be transferred through the activated carbon or charcoal bed 21 and then through the polishing filters 46 and 47 into the agitated adipic acid crystallizer 48. From this point on, crystallization of the adipic acid, washing of the crystals with water and recovery of the purified adipic acid are carried out as described above.

What is claimed is:

1. In a process of purifying crude adipic acid obtained by the molecular oxygen oxidation of a mixture containing cyclohexanone and cyclohexanol in the presence of an acetic acid solvent, the steps which comprise
    (a) dissolving the crude adipic acid in hot water to produce a solution containing in the range of about 30 to about 50 weight percent of adipic acid,
    (b) steam distilling said solution,
    (c) contacting said steam distilled adipic acid solution with an activated carbon and with a cation exchange resin, and then
    (d) crystallizing adipic acid from the resulting solution.

2. The process of claim 1 in which the steam distilled adipic acid solution is first contacted with the activated carbon and then is contacted with said cation exchange resin.

3. The process of claim 1 in which at least one volatile oxidizing agent selected from the group consisting of nitric acid and hydrogen peroxide is added to the solution of the crude adipic acid prior to steam distilling said solution.

4. The process of claim 3 in which the steam distilled adipic acid solution is first contacted with the activated carbon and then is contacted with said cation exchange resin.

References Cited

UNITED STATES PATENTS

| | | | |
|---|---|---|---|
| 2,703,331 | 3/1955 | Goldbeck et al. | 260—537 |
| 2,825,742 | 4/1958 | Schueler et al. | 260—537 |
| 2,858,336 | 10/1958 | Hill et al. | 260—537 |
| 3,148,210 | 9/1964 | Johnson et al. | 260—537 |
| 3,354,056 | 11/1967 | Wegench et al. | 203—92 |

WILBUR L. BASCOMB, Jr., Primary Examiner

U.S. Cl. X.R.

203—34, 38, 41, 48, 96, 97; 260—537